United States Patent [19]

Bollman

[11] Patent Number: 5,218,350
[45] Date of Patent: Jun. 8, 1993

[54] IMAGE PROCESSING METHOD FOR DODGING WITH SOFTENED EDGE TRANSITIONS

[75] Inventor: James E. Bollman, Williamson, N.Y.
[73] Assignee: Xerox Corporation, Stamford, Conn.
[21] Appl. No.: 691,772
[22] Filed: Apr. 26, 1991
[51] Int. Cl.⁵ .............................................. G09G 1/06
[52] U.S. Cl. .................................... 340/723; 340/728; 340/729
[58] Field of Search ....................... 358/443, 453, 461; 340/728, 729, 730, 723

[56] References Cited

U.S. PATENT DOCUMENTS 5,003,303  3/1991  Kellar et al. ...................... 340/730 X

*Primary Examiner*—Ulysses Weldon
*Attorney, Agent, or Firm*—Mark Costello

[57] ABSTRACT

Image appearance characteristics for a display may be defined by two data sets, a first standard data set for the image, and a second set for the area to be dodged, where the dodged area is separated from the remainder of the image by a series of edges. The appearance of any particular pixel in the original is determined by the first bit, or control plane, of the image data, the state of which indicates that pixel appearance is determined by one of the first or second data sets. To soften the transition of the image from one data set to another data set, at the dodged area edges, a filter function is applied to the control plane values, acting on areas adjacent the edge, to create a distribution of control plane values over an area adjacent to the edge. Error diffusion or dithering of the filtered values is then applied to quantize intermediate values generated by the filter function to legal values giving the illusion that the edge changes gradually from the first data set to the second data set, thereby creating a softened edge effect, using only a single control bit in the image data.

8 Claims, 4 Drawing Sheets

STANDARD

MAGNIFIED
PORTION OF
DISPLAY
≈ 5×

SOFT EDGE

MAGNIFIED
PORTION OF
DISPLAY
≈ 5×

IMAGE PROCESSING METHOD FOR DODGING WITH SOFTENED EDGE TRANSITIONS

The present invention relates generally to an image processing method which emulates the photographic processes of dodging with softened edge transition.

CROSS REFERENCE AND INCORPORATION BY REFERENCE

Cross reference is made to U.S. patent application Ser. No. 07/404,395 by Venable et al., entitled "Color Set Selection and Color Imaging"; and U.S. patent application Ser. No. 07/517,895, entitled "Color Editing With Simple Encoded Images", by Bollman et al, both assigned to the same assignee as the present application. Both applications are herein incorporated by reference for their teaching of image manipulation via a color set representation.

BACKGROUND OF THE INVENTION

Image processing methods often seek to emulate standard photographic reproduction in order to provide a wide range of familiar capabilities for users. One such example is noted in U.S. Pat. No. 4,941,057 to Lehmbeck et al., which shows an arrangement for making a proof sheet from a digital image, where each repetition of the image on the proof sheet shows the application of a different filter or screen. The photography analogy is helpful to many individuals who would make use of electronic image processing of images electrically acquired or generated.

One desirable photographic process is "dodging". In a dodging process, a photographic developer changes the local brightness of an area in an image during the printing stage by interposing a cut out, corresponding in size to the area for which brightness is to be changed, between the enlarger and the paper on which the image is to be printed. The cut out is attached to a wire (called the dodger or dodging stick) above the area of the image to be lightened during exposure. Because photographic paper is not exposed to the image (being blocked by the cutout) for the entire development time required to form uniform copy, that particular area has a different brightness level. A cut out moved slightly about the area of interest causes a blending or softening of the exposure at the edges. Of course, the cut out may either cover the local area, or cover the entire image except the local area. In electronic image composition, dodging would be a desirable effect to achieve.

U.S. Pat. No. 4,486,785 to Lasher et al. teaches a technique for enhancing a displayed image stored at a density of 1 data bit per pixel. Particularly, the Lasher patent shows method of reducing the visual impact of stepped edges of an image by selectively introducing gray scale pixels before the image is displayed. U.S. Pat. No. 3,984,828 to Beyers, Jr., teaches the use of alphanumeric characters for television channel number display which have borders of different color or brightness from the body of the characters. U.S. Pat. No. 3,781,849 to Baron et al., U.S. Pat. No. 3,868,673 to Mau, Jr. et al., U.S. Pat. No. 4,408,198 to Kudirka, all show video character generators which operate on edge information for the formation of the characters. U.S. Pat. No. 4,495,491 to Postl and U.S. Pat. No. 4,698,666 to Lake, Jr. et al., both show methods of highlighting a region on a display screen.

All the references cited herein are specifically incorporated by reference.

SUMMARY OF THE INVENTION

The present invention is directed to a method for varying image appearance of a portion of an electronic image on a display screen, with a softened edge transition to the adjacent areas.

In accordance with one aspect of the invention, image appearance characteristics may be defined by two data sets, a first standard data set for the image, and a second set for the area to be dodged, where the dodged area is separated by a series of edges. The appearance of any particular pixel in the original is determined by the first bit, or control plane, of the image data, the state of which indicates that pixel appearance is determined by one of the first or second data sets. To soften the transition of the image from one data set to another data set, at the dodged area edges, a filter function is applied to the control plane values, acting on areas adjacent the edge, to creates a distribution of control plane values over an area adjacent to the edge. Error diffusion or dithering of the filtered values is then applied to quantize intermediate values generated by the filter function to legal values giving the illusion that the edge changes gradually from the first data set to the second data set, thereby creating a softened edge effect, using only a single control bit in the image data.

In accordance with another aspect of the invention, in one possible image processing display arrangement, each pixel within the image is defined by a characteristic value in a data set stored in a look up table. The display arrangement can accommodate at least two data sets of display characteristic values, including a first standard set defined by a first look up table and a second modified set defined by a second loop up table. Each look up table defines a number of appearance characteristics at which each pixel may be represented. The pixels may be either black and white, in which case each level represents a level of gray, or the pixels may be color, in which case each level represents a unique luminance and chrominance combination. The first loop up table provides a series of possible pixel appearances indexed by values having a depth of N bits, where the control plane of the index is empty or equal to "0". The second look up table also provides a series of possible pixel appearances indexed by values having a depth of N bits, where the control plane of the index is filled or equal to "1". The second look up table and the set of pixel appearance levels indexed thereby, at which pixels can appear on the display, represents the modification made by the electronic dodging process to the image over an area that previously was pixel-defined by the first look up table. Thus, the set of values between the two tables is distinguishable not only by image appearance characteristics, but by the existence of a value in the control plane of the level defining the pixel in the look up table. Thus, if an area of pixels is selected, and within that area, the control plane is filled, those pixels will be indexed by a set of values of a different brightness level than the unselected pixels. To soften the transition of the image from one data set to another data set, at the dodged area edges, a filter function is applied, acting on the control plane of the image values, and which has an effect of the values only in regions adjacent to edges. The operation of the filter function creates a distribution of non-legal values for the control plane values. Error diffusion or dithering of the filtered values is then applied, reducing the control plane values to legal values, and giving the illusion that the edge changes gradually from the first data set to the second data set, thereby creating a softened edge effect, using only a single control bit in the image data.

These and other aspects of the invention will become apparent from the following description used to illustrate a preferred part of the invention in conjunction with the accompanying drawings in which.

Figure 4A:
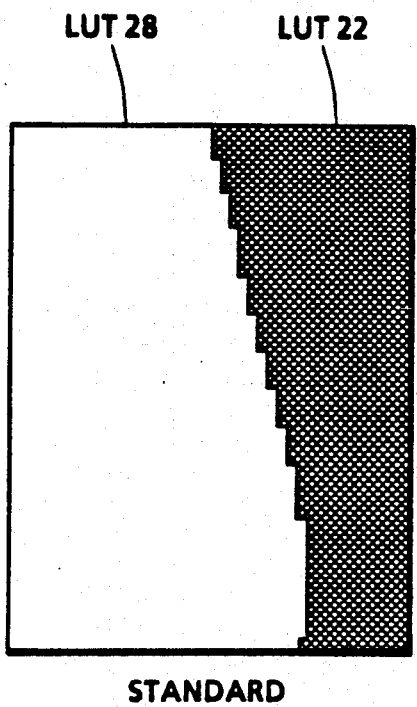
Figure 4B:
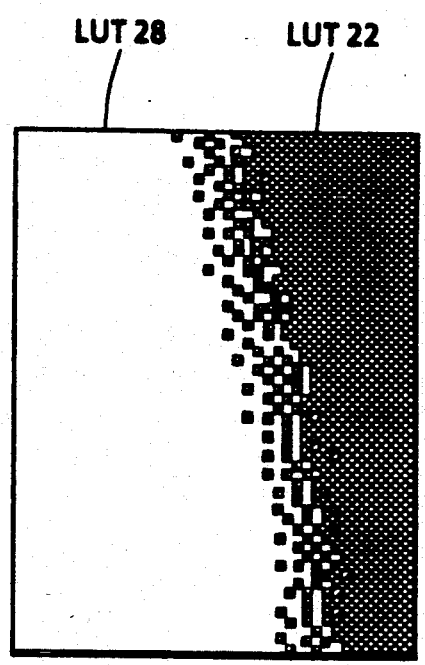
Figure 5A:
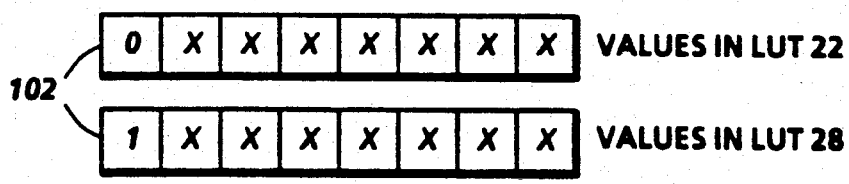

FIGS. 4A and 4B respectively show a magnified comparison of an edge in which the softened transition is not applied and the same edge where the softened edge transition is applied;

FIG. 5A shows an example position of the control bit in the image data; and

Figure 5B:
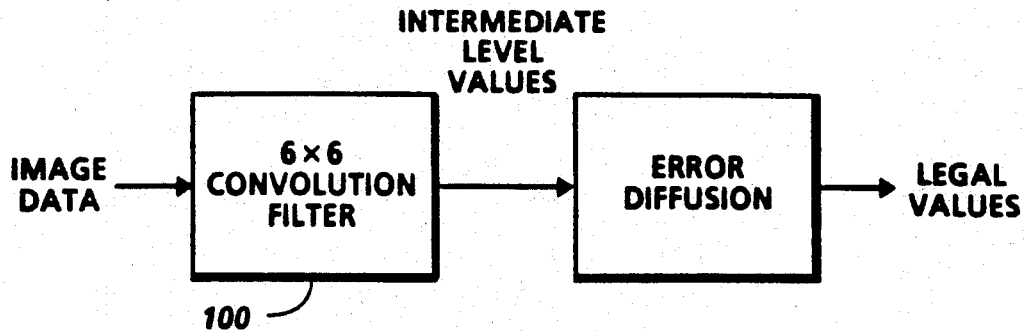

FIG. 5B shows a block diagram of the edge softening system operable on the control bit.

Figure 1:
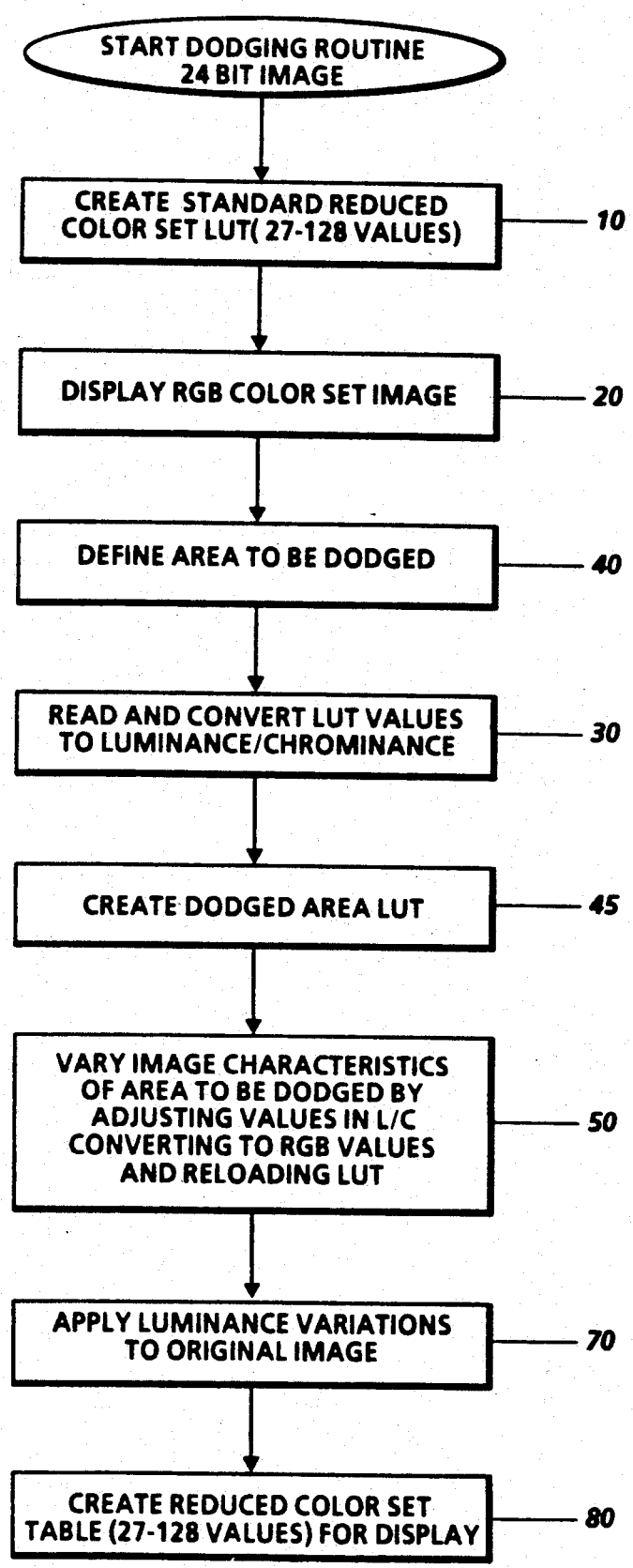
FIG. 1 shows a step by step flow chart of the creation of the reduced color set from the original image, and subsequent variation of the color.

With reference now to the drawings where the showings are for the purpose of illustrating an embodiment of the invention and not for the purpose of limiting same, FIG. 1 shows a flow chart of the inventive process that will be referred to and described with respect to the invention.

Figure 3:
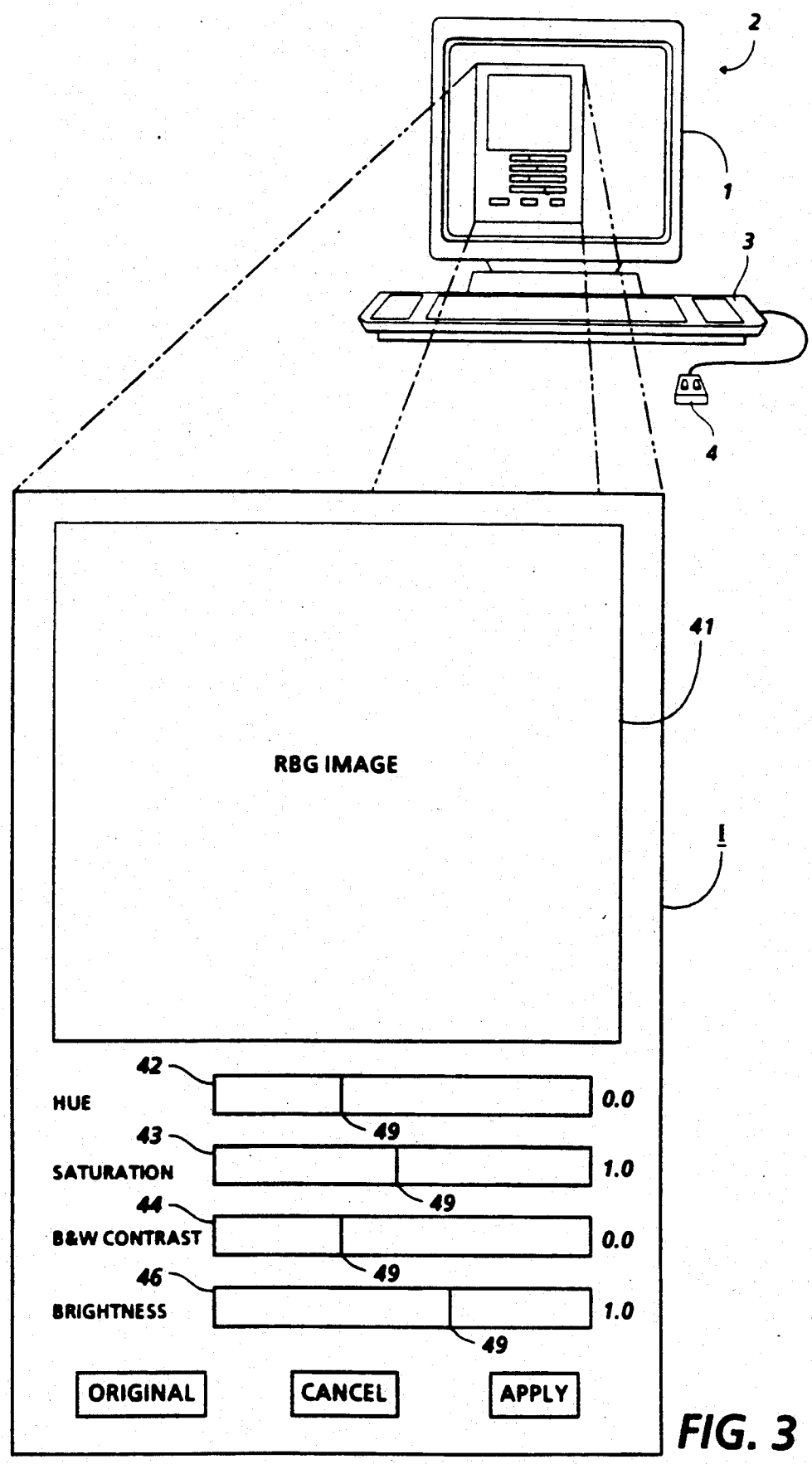
FIG. 3 shows a user interface displayable on a computer workstation and usable in association with the described invention.

With reference to FIG. 3, high quality, high density CRT display 1 reproduce color images in red, green and blue components. Each pixel on the color image, originally produced in accordance with several known processes, may be defined with a 24 bit value, which provides three color separations, typically red, green and blue, each represented by an 8 bit value (0-7). Accordingly, the color set or palette available for use in such displays has about 16 million colors. In the embodiment described, a Sun workstation having 8 bit deep graphics, with a UNIX operating system was used for color modification of images. Sun Workstations are the product of Sun Microsystems, Inc., of Sunnyvale, Calif. The workstation 2 used in the development of the described invention may be characterized as personal minicomputers, with multi-tasking operations. User data entry at the workstation is typically provided through keyboard 3 and mouse 4. Of course, such features are not required, and other processors and data entry devices are possible. The graphics display used was a standard Sun Microsystems 1152×900, 8 bit deep display. Programs implementing the described invention were produced in the "C" language. The user interface that will be further described hereinbelow was produced using the X-Windowing Systems software, from the Massachusetts Institute of Technology, Cambridge, Mass. A similar user interface development environment is the Sun X-News software, a proprietary software of Sun Microsystems, Inc. Of course, other graphic display systems and other software may be used to the same effect as those used to the produce the present invention. Another suitable device for implementing the present invention might be one of the Macintosh II family of products, produced by Apple Corporation of Cupertino, Calif.

With reference again to FIG. 1, a first step 10, U.S. patent application Ser. No. 07/517,895, filed May 2, 1990 by James E. Bollman et al., entitled "Color Editing With Simple Encoded Images" describes a method for processing a color image initially defined by 24 bits of information with a reduced color set. In the described embodiment, an image originally defined in 24 bit color, is reduced to a predetermined number of colors (a color set), between 27 and 128 in number, each color indexed in an 8 bit look up table, so that each pixel is color identified with a index pointer to a color or appearance characteristic in the look up table. Each color constitutes a triplet, selected from a relatively small number of red green and blue values (for example, 4 red, 8 green and 3 blue levels, for a color set of 96 colors), and displayed at step 20. These values are then converted to chrominance/luminance space in a known chrominance/luminance transform at step 30. The position of the color set may then be varied through luminance/chrominance space to derive a new color image, with the actual rotation equations only applied to the reduced color set. Upon achieving the desired image appearance, the luminance/chrominance rotation selected is applied to the original 24 bit image image, and a new reduced RGB color set is derived. Because a number of levels in the color set is selected to accommodate two look up tables or indexes of colors, pixels identified by either table may appear on the display. In a graphics display which provides a possible 256 levels (an 8 bit deep display), 128 triplets allows two complete look up tables or color sets available for an image. In the aforementioned discussion, preferred color sets varied from 27 to 128 triplets, thus allowing two look up tables in a 256 level mapping. If a 10 bit graphic system was used, the limit would be 512 triplets, for two look up tables in 1,024 triplets. Increased depth of the graphic display system beyond 10 bits allows an additional number of triplets to be used. It will however, generally be preferable to operate on a smaller color set than the 16 million possible colors in a 24 bit system.

Figure 2:
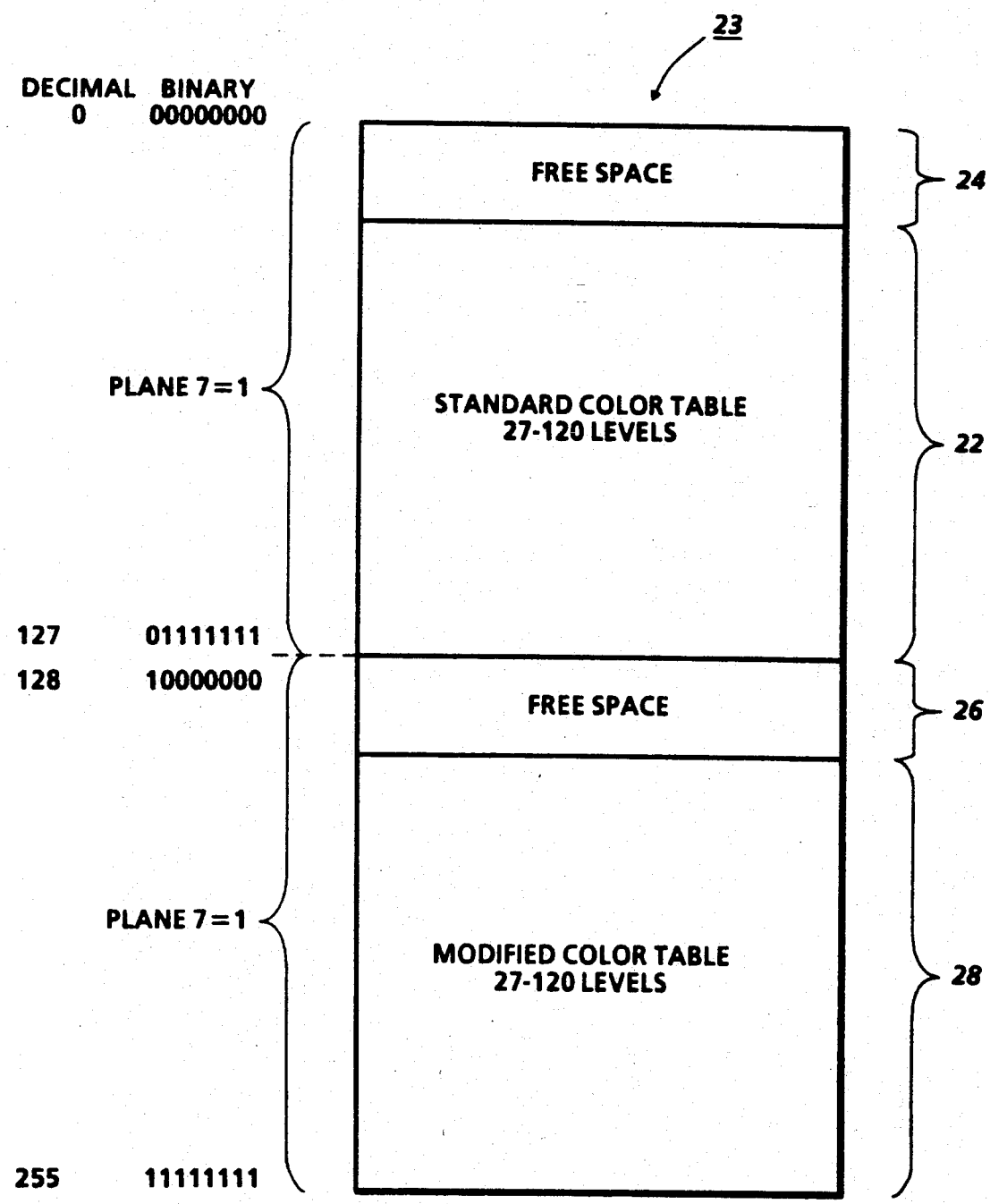
FIG. 2 shows a memory mapping of the color set in an 8 bit system which allows a standard color set and a modified color set to exist on a single display.

As shown in FIG. 2, color look up tables are stored in a 256 level (0-255) look up tables 23 in the described 8 bits graphic systems, with a memory mapping of FIG. 2, where the standard look up table of between 27-120 levels is stored on a portion 22 of register 23. Portions 24 and 26 may provide a number of levels for free space for color that are unique to other display applications. Portion 28 is a modified color table for the dodged area that will explained hereinafter. It will be noted that plane 7=0 for the standard color table in portion 22 of the register, while plane 7=1 in the modified color table portion 28 of the register.

With reference again to FIG. 1, at step 40, within the image, an area to be dodged is defined, through standard area definition techniques. This may be accomplished with a manual outlining arrangement, where the area is outlined with appropriate mouse software, or object/edge finding software, or any other area selection technique. The area to be dodged may be either inside or outside the area defined. When the process of dodging is selected, at step 45, a new look up table is created having perhaps similar chrominance values, but different luminance values representing the brightness of the image. Again, with reference to U.S. patent application Ser. No. 07/517,895, by James E. Bollman et al., entitled "Color Editing With Simple Encoded Images", the manipulation of colors in the defined portion of the original image would be accomplished in the reduced color set representation of the original image, through the user interface I of FIG. 3, which shows a window arrangement where, below the image display space 41, sliders 42, 43, 44 and 46, respectively representing hue, saturation, black and white contrast, and brightness, are selectable by movement of indicators 49 with a mouse or other data entry device. Hue and saturation represent chrominance values, and variations of hue and saturation vary the actual color of the image. Black and white contrast and brightness represent luminance values, and variations of black and white contrast and brightness represent variations in the intensity of the image. While dodging refers to black and white contrast and brightness variation in photographic sciences, in the context of the present invention, dodging refers to variation of image appearance, coupled with softened edges, and may be used with hue, saturation, black and white contrast or brightness variations, or combinations thereof. Other variations are also within the scope of the invention. With reference to FIGS. 1 and 2, at step 50 in the dodging process, the image appearance characteristics, of the defined area, to be dodged are varied, by adjusting the image data values in luminance/chrominance space. Variations to the image look up table in the luminance/chrominance color space are converted directly back to RGB space to modifying the color set in the standard color table 22 (which are not changed as part of the dodging process), and thereby create a new color set in the modified color table 28. In turn, the new reduced color set RGB image defined as a result of the conversion is displayed to reflect the changes. Since only a small number of values (27-120) are being changed, the modification made at the user interface I of FIG. 3, are applied to the display image in essentially real time.

A step 70, since the desired image appearance modification has been derived, the luminance/chrominance equations that define the relative position of the image in luminous chrominance space with respect to the original position are stored and applied to the original image. This operation is not expected to occur in real time and may be referred to a high speed computer on a network for processing. Alternatively, because the user expects the delaying can select the time of its occurrence, the user's processor on the user's own workstation may apply the new luminance/chrominance equations to the 24 bit pixel data.

At the last step 80 in the dodging process, the newly modified 24 bit per pixel data is again displayed on the workstation in the reduced color set mode, for both look up tables 22 and 28, essentially repeating steps 10-30. The image displayed might vary slightly from the images modified, since many imaging artifacts that appear on the screen during modification are removed when the underlying original image is changed.

In accordance with the invention, and with reference to FIGS. 4A and 4B, a hard edge (FIG. 4A) may appear about the image area which was modified. By a hard edge, it is meant that the edges abruptly show the change from the standard look up table to the modified look up table. With reference to FIGS. 5A and 5B, to soften the edges, a convolution function, in this case represented by a blur filter 100 is applied to the seventh plane or control bit 102 of the 8 bit pixel defined image, including the the modified look up table-defined pixels. The effect of the convolution function is to act only on the edge of the area defined by the modified look up table even though applied to the whole area. This is because within the dodged area, values in the first plane are equal to zero. Therefore, it is only at the interface, where there are values which are "0" and "1" that the convolution filter has any effect. It has been empirically determined that a 6×6 blur function, works in a manner that produces desirable soft edges on the specified displays. However, the size of the area treated could change with the size of the image and the amount of softening desired. The results of the convolution filter applied to the masked area are a number of intermediate level values in the control plane, varying from 0 to 255, which are not legal values, i.e., only 0 and 1 are valid values in the control plane. The 6×6 blur filter result is then passed through an error diffusion process or other halftoning process, in which, through the area in which the filter has been applied, a slowly varying, pixel by pixel change from the mask function (represented by values which commence with one) to the unmasked values (represented by values which commence with zero) is derived (FIG. 4). An error diffusion process compares each intermediate value with a threshold, and the difference between the intermediate level value and the threshold is forwarded to a selected group of neighboring pixels, in accordance with a weighting scheme. In a dithering or halftoning arrangement, over a given area, each intermediate level value within a selected local area is compared to one of a set of preselected thresholds, comprising a matrix of threshold values.

Obviously, modifications will occur to others upon reading and understanding the specification taken together with the drawings. The embodiments described are only examples, and various alternatives, modifications, variations or improvements may be made by those skilled in the art from this teaching which are intended to be encompassed by the following claims.

I claim:

1. A method of modifying a scanned original image displayed in a computer N-bit video display system, where N is an integer value, to vary image appearance within a defined area on a video display thereof with respect to the entire displayed original image while providing softened edge transition between displayed areas to which image appearance variation has been applied and displayed areas to which image appearance variation has not been applied; the scanned original image defined by a digitally encoded representation thereof and composed of pixels each defined by a first number of appearance characteristic values, each appearance characteristic value indexed in a first look up table in a display memory having space for indexing a second number of appearance characteristic values greater than said first number; each of said first number of appearance characteristic values having a single control bit of said N bits equal to a first of two legal values; the method of modifying a scanned original image comprising:

displaying on the video display the scanned original image, each pixel thereof produced in accordance with an appearance characteristic value indexed with a look up table stored in display memory;

at a computer data entry device associated with the computer n-bit video display system, selecting a group of pixels on the video display over which image appearance will be varied with respect to a remainder of the image;

storing appearance characteristic values for said defined area in a second look up table in the display memory, each pixel defined by an appearance characteristic values having a control bit equal to a second of said two legal values;

applying a blur filter function to said image, said filter function operable on the control bit, and producing a series of values intermediate said first and second legal values in a portion of the original image adjacent to the transition between said defined area and said remainder of the image;

applying a quantization function to said intermediate values to make said intermediate values equal to either of the first and second legal values, and thereby creating a dispersion of said first and second common values;

redisplaying the image, with those pixels in the selected group of pixels on the video display indexed to the second look up table in the display memory, and all other pixels of the video display indexed to the first look up table in a display memory.

2. The method as defined in claim 1, including the step of:

varying the appearance characteristic values stored in said look up table in display memory for said defined area of the original image, to change the image appearance, whereby a new set of appearance characteristic values are produced for storage in the second look up table.

3. The method as defined in claim 1, wherein said quantization function is an error diffusion process.

4. The method as defined in claim 1, wherein said blur filter function is the convolution of the functions given by the control bit of the defined area, and the control bit of the remainder area.

5. An image processing method for providing softened edge transition between a defined area of an original image to which a processing function has been applied and a remainder area to which the processing function has not been applied, the original image defined by a digitally encoded representation thereof composed of pixels each defined by a multi bit appearance characteristic value, including the steps:

defining each pixel in the original image by one of two data sets of appearance characteristic values, a first standard data set for the remainder area, and a second modified data set for the defined area, the data set defining any particular pixel determined by a control bit in the multi bit appearance characteristic value having one of two legal states, the state thereof indicating that pixel appearance is determined by said first or second data sets;

applying a filter function to the control bit of each pixel appearance characteristic value in the image, the filter function selected to operate at a transition area overlapping the defined area and the remainder area, said filter function producing a set of intermediate values only at the transition area;

applying a quantization function to said intermediate values to make said intermediate values equal to either of the first and second legal values, thereby creating a dispersion of said first and second common values.

6. The method as defined in claim 5, including the step of:

varying the appearance characteristic values of the data set for said defined area of the original image, to change the appearance of the defined area of the image.

7. The method as defined in claim 5, wherein said quantization function is an error diffusion process.

8. The method as defined in claim 5, wherein said filter function is the convolution of a function given by the control bit of the defined area and a function given by the control bit of the remainder area.

* * * * *